Dec. 4, 1956 G. P. MONET 2,773,028
DIALYSIS PROCESS
Filed April 29, 1952 2 Sheets-Sheet 1
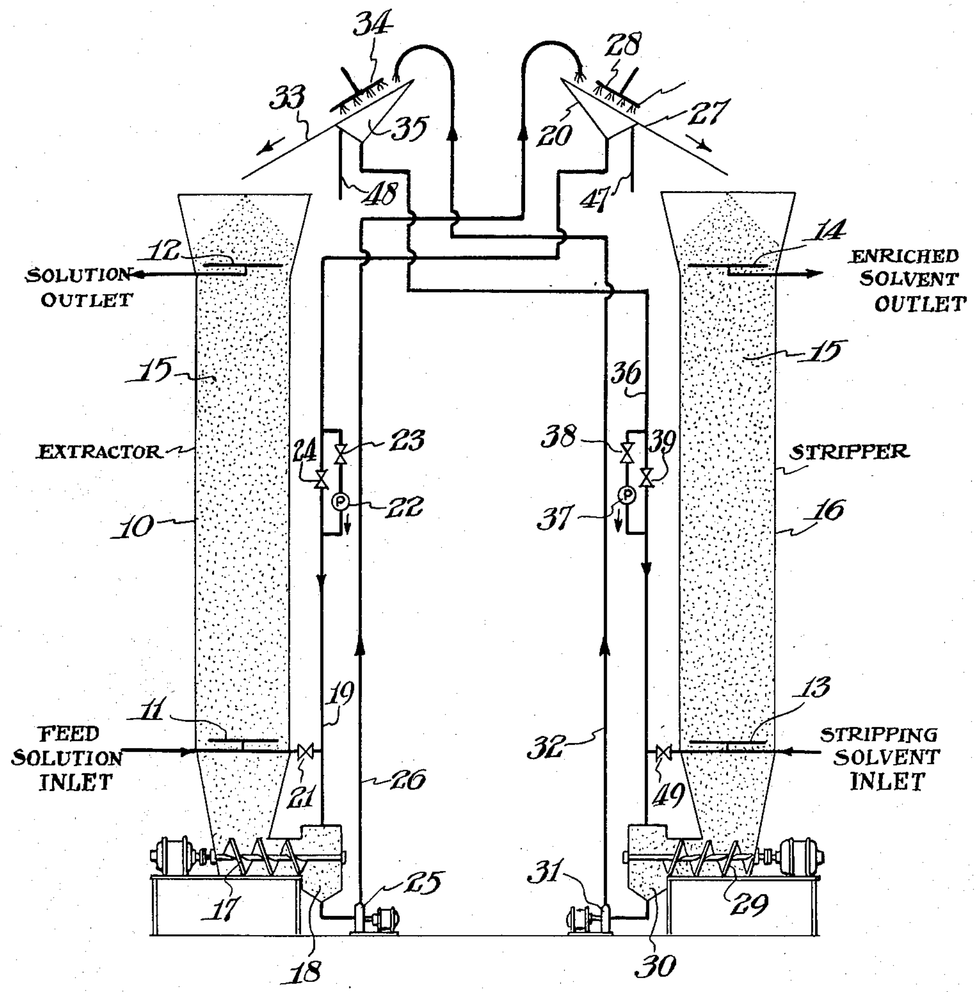
INVENTOR:
Gilbert P. Monet
BY Harry J. McCauley
ATTORNEY.

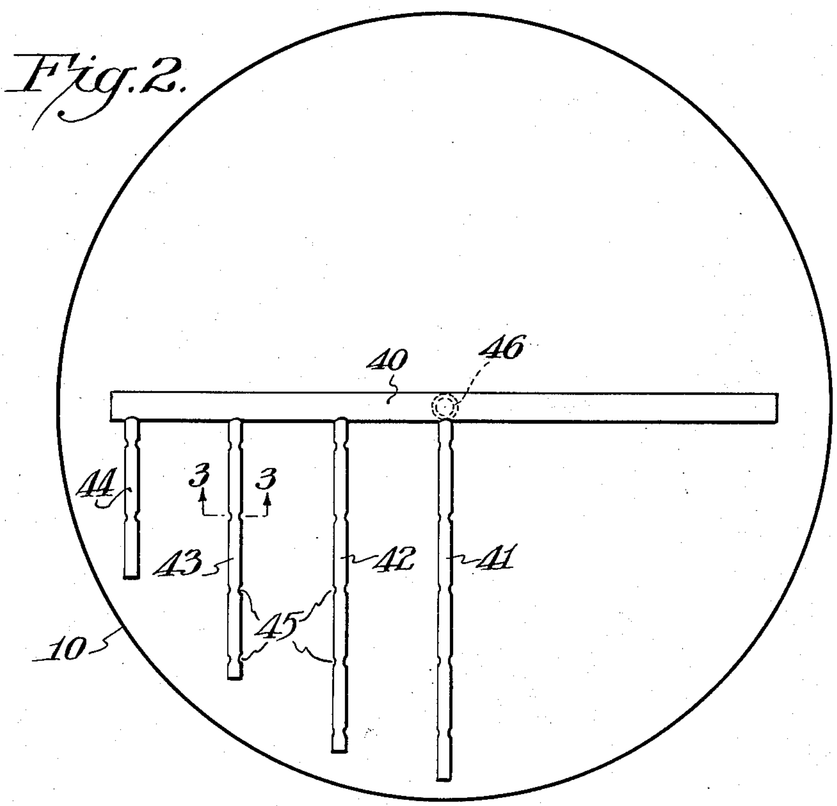
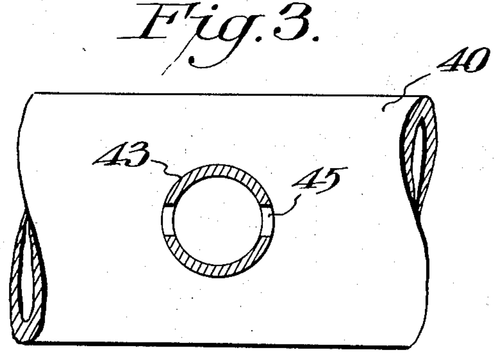
INVENTOR:
Gilbert P. Monet
BY Harry J. McCauley
ATTORNEY.

United States Patent Office 2,773,028

Patented Dec. 4, 1956

2,773,028

DIALYSIS PROCESS

Gilbert P. Monet, Wilmington, Del., assignor to E. I. du Pont de Nemours and Company, Wilmington, Del., a corporation of Delaware Application April 29, 1952, Serial No. 285,035

8 Claims. (Cl. 210—8.5)

This invention relates to a dialytic process and particularly to a dialytic process utilizing a granular form dialytic separation medium.

It has long been known that dissolved crystalloids may be separated from suspended colloids by preferential diffusion through membranes having pores of appropriate size, which phenomenon is termed dialysis. Dialytic separations are customarily conducted in apparatus built up from a number of frames, each of which supports a single unitary membrane, opposite sides of which are connected to the liquid transfer system, so that one side of the membrane is in direct contact with the liquid whose components it is desired to separate while the other side is in direct contact with the liquid which it is desired to enrich. Such apparatus is disadvantageous for the reasons that relatively low membrane areas are exposed to the liquids processed, conventional membranes are weak and subject to rupture, and the capital investment and installation costs are high, all of which limits severely the economic attractiveness of dialytic separation.

A primary object of this invention is to provide an improved process for the accomplishment of dialytic separations.

Another object of this invention is to provide a simple and relatively inexpensive dialysis process.

Another object of this invention is to provide a dialysis process which can be conducted in compact apparatus occupying a small floor space.

Other objects of this invention will become apparent from this description and the following drawings, in which:

Figure 1 is a partially diagrammatic view of an equipment arrangement adapted to effect dialytic separation according to this invention, Figure 2 is a top plan view of one embodiment of liquid distributor which may be employed in either the extractor or the stripper of Figure 1, only one quadrant of the distributor being shown, and Figure 3 is a partial side elevational view taken on line 3—3 of Fig. 2.

Generally, the objects of this invention are accomplished by utilizing a loose granular gel as the dialytic separation medium, exposing the gel grains to the solution to be extracted for a sufficient time to effect the extraction, and then removing the grain from the solution, after which extracted material may be stripped therefrom and the gel grains recycled to the extraction zone or, if it is not desired to reuse the gel, it can be passed to other process steps or disposed of as waste. The granular gels utilized are selected on the basis of inherent physical properties, so that they are substantially insoluble in the liquid processed, non-reactive with any of the process materials and possess a high porosity, while still having effective dialytic properties. As will become apparent from the detailed description which follows, a wide variety of materials are suitable for the purpose contemplated.

In one embodiment the process of dialytic separation according to this invention comprises contacting the solution to be dialyzed with a relatively high proportionate volume of gel grains saturated with the liquid phase solution component, preserving contact for a sufficient period of time to permit dialysis of the crystalloid component, which it is desired to separate, into the interior of the gel grains, separating the grains from the solution treated, contacting the grains with fresh liquid phase solution component to extract the crystalloid component therefrom, and repeating the cycle. Under these circumstances, the crystalloid component distributes itself evenly throughout the liquid within the gel grains, while colloids are barred, thus effecting a corresponding reduction in the percent crystalloid content of the solution dialyzed. It will be understood that the manner and sequence of contacting may be carried out in a variety of ways known to those skilled in the art of chemical engineering, and that the process is suited to either batch or continuous operation; however, it is preferred to operate on the counter-current principle continuously and, in the interest of simplicity of representation, this embodiment is hereinafter described in greatest detail. It will be further understood that while water is the liquid phase component most commonly encountered in dialytic separations, the process of this invention is equally applicable to systems employing hydrocarbons, or mixed hydrocarbons, with or without water added, as the liquids, in which case the gel employed must be chosen so that it will be insoluble in these liquids and non-reactive with any of the other components of the system, all as hereinabove described.

A great number of dialytic media can be employed in the practice of this invention, regenerated cellulose and polymeric compositions being preferred where water is the process liquid, while inorganic gels, such as those of silica and alumina, are suitable where hydrocarbons constitute all or a part of the liquid component. The interiors of the grains may be essentially hollow, as in the case of spheres defined by skins or dialytic media, or the grains may appear to the eye to be solid throughout although possessed of a myriad of small passages of a size capable of retaining liquid containing dissolved crystalloids while still barring the entrance of colloids. In some instances a composite type of gel is particularly preferred, since the properties of density, porosity, strength, and other characteristics can be fitted precisely to the specific requirements of the process system and cycle involved. This is a considerable advantage from the standpoint of design, since it permits a wider choice of alternatives than is generally possible in unit chemical engineering operations.

The shape of the gel grains utilized is not critical and includes spherical, cylindrical, rectangular or other configurations, spherical and cylindrical shapes being somewhat preferable from the standpoints of uniform packing and ease of cycling. The grains may be formed economically in a number of ways known to the art, such as by solidification of falling drops of regenerable materials to form spheres, continuous extrusion and cut off of solid gel rods to form cylinders, and dieing out solid gel sheets to make rectangles or squares. I have found that an optimum size for the removal of crystalloids from water as solvent comprises grains with a maximum dimension of about $\frac{1}{16}''$. In a typical case where the gel was regenerated cellulose made by the viscose process and formed in cylindrical shape, it was computed that there was provided an average dialytic surface of about 10 sq. ft./lb., or 300 sq. ft./cu. ft., while the solvent water carrying capacity was determined by experiment to be about 80% by weight, based on the weight of the wet gel. It is, therefore, apparent that a very extensive dialytic expanse is presented to the solution to be dialyzed, which insures high overall efficiency, even though absolute diffusion rates are relatively low.

The following gel compositions are representative of materials which are suitable for the practice of this invention:

*a. Viscose cellulose.*—Xanthate viscose was set to a soft gel and then extruded through orifices about 1/16" in diameter into a regenerating bath comprising a water solution of about 10% $H_2SO_4$ and 20% $Na_2SO_4$. The regenerated cellulose thereby formed was washed with water until the wash water was neutral to pH paper, after which it was cut up into small grains using an Abbe cutter provided with a 1/8" screen. The grains were then decolorized by two extractions with 5–8% NaOH solution and again washed with water to neutrality. Finally, the material was placed in a column and backwashed to remove fines. The resulting product was white in color and appeared quite homogeneous in structure.

*b. Nitrocellulose.*—Solutions in the range of 2 to 8% cellulose nitrate (11–13.5% nitrogen content) were prepared, using a mixture of 1 part of anhydrous diethyl ether to 2 parts of absolute ethyl alcohol as the solvent. A sheet of nitrocellulose was formed by pouring the solution on to a glass plate, removing part of the solvent by evaporation, and removing the balance and coagulating by water washing. The nitrocellulose was then cut to 1/16" grain size by breaking into conveniently sized pieces and passing through the Abbe cutter described in *a*.

*c. Denitrated nitrocellulose.*—The unitary sheet of nitrocellulose, prepared as described in *b*, was first washed with a mixture having the proportions: 900 cc. 5N. $NH_4OH$ solution saturated with $H_2S$ and 100 cc. of ethyl alcohol. Washing was continued, in the order named, with water, carbon disulfide and acetone, after which the sheet was subdivided as described in *b*.

*d. Formalin treated gelatin.*—Air-dried gelatin was soaked in an ethyl alcohol-water mixture (e. g. 20% ethyl alcohol, 80% water) for 24 hours, after which 1 cc. of 40% formalin was added for each 10 cc. of alcohol-water mixture employed. Soaking was continued for an additional 24 hours, when the gelatin sheet was washed and formed into grains in the manner described in *b*.

*e. Polyvinyl acetate.*—15 gms. of a polymer of polyvinyl alcohol and butyraldehyde (Carbide & Carbon Chemicals Co. resins XYHL or XYSG) were dissolved in 85 gms. of a solution consisting of 40% acetone and 60% isopropyl alcohol (91% alcohol, 9% water). A sheet was formed by pouring the solution on a glass plate, evaporating the solvent and washing with water, after which the gel was broken into grains by the procedure of *b*.

*f. Hydrolyzed ethylene vinyl acetate.*—Films of this composition were prepared according to the teachings of U. S. P. 2,467,774 and thereafter ground to discrete form as hereinabove described for the preceding compositions.

*g. Silica gel.*—Spheroidal silica gel prepared as described in U. S. P. 2,384,946 is suitable for use according to this invention after thorough washing with water to remove any soluble residuals, drying, and soaking in the liquid phase component of the solution which it is desired to dialyse.

*h. Carboxy methyl cellulose.*—Spherical beads of carboxy methyl cellulose were prepared by coagulating drops of 4% sodium carboxy methyl cellulose in water solution by allowing the drops to fall at a rate of about 100 drops per minute from a burette into a coagulating bath of the following composition:

| | Ml. |
|---|---|
| 10% $Al_2(SO_4)_3/18H_2O$ | 400 |
| Methanol | 400 |
| Water | 1200 |

After about 15 minutes residence in the coagulating bath, the beads were transferred to a hardening bath consisting of

| | Liters |
|---|---|
| 10% $Al_2(SO_4)_3/18H_2O$ | 1 |
| Water | 2 |

and allowed to remain therein for 48 hrs. The beads were then washed in cool running tap water for 30 minutes, when they were ready for use.

Examination of the beads disclosed that they comprised a spherical skin surrounding a water core, the average properties being as follows:

| | |
|---|---|
| Diameter | 0.160". |
| Weight | 0.0324 gm. |
| Shell thickness | 0.015–0.25". |
| Bulk density | 23.2 lbs./cu. ft. |
| Surface area | 175 sq. ft./cu. ft. |
| Crush strength | 320 gms. |
| Liquid content | 90.3%. |

*i. Composite inorganic-organic gel.*—Spheroidal silica gel may be prepared as described in *g*, being first washed with water and then thoroughly dried. The grains are coated on the outside with polyvinyl acetate resin of the composition set out in *e* by stirring for 5 minutes in a 5% solution of the resin in acetone at a temperature in the neighborhood of 0° C. The grains are then removed and dried under vacuum at room temperature in a tumbling barrel, any agglomerates being removed by screen sizing after completion of drying, so that the final size is approximately 1/16" maximum dimension.

Referring to Fig. 1, the dialysis is effected in extractor 10, which comprises an open cylindrical vessel of sufficient capacity to maintain contact between the gel grains and the feed solution for a time interval of the order of approximately 5–50 minutes, depending upon the number of equilibrium stages desired. The feed solution is preferably introduced through a distributor, indicated generally at 11, adapted to inject the feed uniformly over the cross section of 10.

A suitable design of distributor is detailed in Figs. 2 and 3 and comprises a central header 40 provided on both sides (only one quadrant being detailed in Fig. 2) with laterals, such as those designated 41, 42, 43 and 44. In a typical installation, where the internal diameter of extractor 10 was 6 ft., the laterals were disposed at 10" intervals along header 40, the lengths of the laterals being 2¾ ft. in the case of 41, 2½ ft. for 42, 2 ft. for 43 and 1½ ft. for 44. In this installation, header 40 was 1½" nominal size and all laterals were ½" pipe. As indicated in Figs. 2 and 3, the laterals were provided with regularly disposed orifices 45, ¼" in diameter, spaced on 6" centers measured from the orifices adjacent header 40, which were located ¼" therefrom. Feed solution entered 40 through central opening 46, representing the mouth of a feed pipe which constituted an extension of the feed solution inlet line, the feed pipe supporting distributor 11 in position within 10. Identical mechanisms 12, 13 and 14 are shown in Fig. 1 for solution withdrawal, stripping solvent introduction and enriched solvent withdrawal, respectively, it being understood that the direction of flow through the withdrawal devices 12 and 14 is the reverse of that for the liquid introduction devices 11 and 13. It will be apparent that many other designs of liquid distributor may be utilized with this invention, and that any convenient system of associated pumps and auxiliary piping can be connected into the equipment arrangement, depending upon the particular process requirements obtaining.

As indicated in Fig. 1, the gel grains 15 move countercurrent to the liquid mixture which it is desired to extract in vessel 10, and to the stripping liquid which is contacted in stripper 16, the latter vessel being shown as identical in construction to 10, although this is not necessary.

Gel containing a full burden of dialysate is removed from vessel 10 by powered screw conveyor 17 into slurrying chamber 18, where it is diluted with wash liquid drained from catch trap 20 through line 19. Valve 21 is provided between line 19 and extractor 10 to permit circulation of a portion of the wash effluent from 20 through 10, under pressure of by-pass pump 22, when valve 23 is open and valve 24 is closed, or the full wash may be circulated to 18 by gravity flow through open valve 24, with pump 22 cut out of operation. The slurried, dialysate-laden gel is withdrawn from chamber 18 by pump 25 and pumped through line 26 to washing screen 27, where surface liquid is removed by fresh liquid spray 28. Screen 27 may be a conventional vibratory screen conveyor, or simply a stationary screen inclined sufficiently so that the gel grains move continuously through the washing spray into the upper end of stripper 16.

In stripper 16, the gel is substantially purged of dialysate by contact with fresh liquid phase component introduced through 13, by dialysis in the reverse direction to that carried out in 10. Stripped gel saturated with liquid component is removed from 16 by powered screw conveyor 29 and passed to slurrying chamber 30, from whence it is forced by pump 31 through line 32 to washing screen 33, identical with 27. The purged gel is given a final wash by liquid spray 34 and then discharged into 10 for a repetition of the cycle. Wash effluent from catch trap 35 is returned through line 36, which may be provided with pump 37 and valves 38, 39 and 49 for effecting liquid handling in the same manner as hereinbefore described for the corresponding elements 22, 23, 24, and 21, respectively, in the extractor circuit. Constant level drainage lines 47 and 48, connecting catch traps 20 and 35 with the sewer, insure against back overflow of wash effluent resulting from pressure fluctuations in the liquid supply to the washers, or from other causes.

In the operation of the apparatus hereinabove described, it is desirable for best results to contact from about 1 to about 3 volumes of gel grains (having approximately 50% void space) with 1 volume of liquid. Under these circumstances, appreciable quantities of process liquid will be removed as surface entrainment which, however, is substantially all recovered by the washing of spray 28.

It will be understood that the apparatus shown in Figure 1 comprises two interconnected identical liquid-solid contacting circuits, this arrangement possessing the advantage that either extraction or stripping may be carried out in vessels 10 or 16, at the operator's option, through the use of simple, auxiliary piping not shown.

The following examples constitute typical applications of both the continuous counter-current embodiment and the batch-wise embodiment of this invention, it being, however, understood that this invention can be employed generally to effect dialytic separations of crystalloids from colloids and that it is not limited to the specific examples cited.

*Example 1.—Recovery of caustic from hemicellulose*

In rayon manufacture, the raw cellulose linters are customarily steeped in 16–17% NaOH prior to xanthation. After use, the steep liquors are discolored and contain hemi-cellulose, a colloidal impurity. Dialysis constitutes a convenient method of purification and caustic recovery.

Two contactors, having a capacity of 6 cu. ft. each, were arranged as shown in Fig. 1 and a regenerated cellulose gel, prepared as described in gel composition example *a*, was utilized as the dialytic medium. The gel was circulated through the contactors as a settled bed at such a rate that the hold-up time in each was of approximately 30 mins. duration, a period which laboratory tests indicated was sufficient to achieve substantial attainment of dialytic equilibrium.

The following data was procured during a four hour run in which stability of operation was attained.

Rate of steep liquor feed to extractor, 2.25 l./min.
NaOH in steep liquor feed, 16.5%
NaOH in steep liquor effluent leaving extractor, 1.5%
Rate of soft water (stripping liquid) feed to stripper, 4.55 l./min.
NaOH in stripping liquid effluent from stripper, 7.4%
Hemicellulose in stripping liquid effluent from stripper, negligible
Residual NaOH in gel grains recycled to extractor, 1.0%

*Example 2.—Reduction of salt content of colloidal silica*

A silica sol having a composition of 3.0% $SiO_2$ and 2.1% $Na_2SO_4$ was made by the reaction of aqueous sodium silicate with sulphuric acid. The presence of electrolytes, such as $Na_2SO_4$, deleteriously affects the stability of silica sols and limits the degree to which they can be concentrated by evaporation removal of water.

Using apparatus similar to that shown in Fig. 1 and a gel of composition *b* hereinabove described, the sodium sulphate content of the sol was maintained at 0.02–0.05% by dialysis between successive evaporations, to produce a sol of a final $SiO_2$ concentration above 15% and a $Na_2SO_4$ content of 0.5%.

*Example 3.—Separation of high and low molecular weight polyglucose*

The process of this invention is adapted not only to the separation of crystalloids from colloids but also to the concentration of different molecular weight fractions of relatively high molecular weight substances, such as polyglucose, for example. In this instance the separation was accomplished by batch operation in the manner hereinafter described.

The polyglucose sample treated comprised a 5% water solution wherein the polyglucose was determined to have an average molecular weight of 13,000 by the light scattering method, it being estimated that approximately 80% by weight of the polymer had a molecular weight between the limits of 5,000 and 30,000. The specific viscosity/concentration at 10% concentration of the sample was 0.046 as determined by testing with an Ostwald-Vinski viscosimeter.

For use in biological applications, polyglucose and related substances, such as the polysaccharides, must be molecularly classified rather precisely to avoid undesirable immunological reactions. Granular gel dialysis affords an exceptionally desirable method of accomplishing this classification because conventional dialytic membranes frequently develop fine pin holes, which cannot easily be detected by visual observation or fast inspection techniques and, furthermore, the dialysis of a given amount of the polymer can be conducted much more speedily with granular gels than with membranes, thereby reducing the time available for bacterial decomposition. An additional advantage of the gel grains is that their exterior surfaces may be readily washed to remove any residual process material, facilitating clean-cut classifications.

In this example a single 500 cc. volume of the polyglucose sample was stirred for periods of 15 minutes with five separate 150 gm. portions of regenerated cellulose made as described in example *a* hereinabove. The gel grains had a maximum dimension of 1/16" or less and a moisture content of 80%. After each contacting the sample solution was filtered from the gel using a Buchner filter connected to a source of vacuum and was then stirred with the next fresh portion of gel in sequence. The gel grains were not washed free of sample adhering to the surface and the carry-over loss from this cause is indicated in the following tabulation of sample volume recovered after each of the several contactings:

| | Cc. |
|---|---|
| Solution volume after first contacting | 460 |
| Solution volume after second contacting | 435 |
| Solution volume after third contacting | 360 |

| | Cc. |
|---|---|
| Solution volume after fourth contacting | 330 |
| Solution volume after fifth contacting | 300 |

After treatment with the fifth gel portion, all of the gel portions were combined and washed with a large volume of distilled water to extract the low molecular weight fraction concentrated therein by dialysis. The total volume of washing liquid measured 3190 cc. and the average molecular weight of the polyglucose solute therein was found to be approximately 7,000.

The sample filtrate recovered after the fifth gel contacting was similarly analyzed and the average molecular weight determined to be 18,000. From these data it will be understood that a high order of molecular weight classification was obtained by the granular gel dialysis process of this invention, even though the gel grains were not washed free of adhering residual sample.

*Example 4.—Recovery of caustic from viscose*

A viscose solution having a composition of 5.2% NaOH, 8.6% cellulose, 2.0% $CS_2$ and the balance water was processed according to this invention to recover a portion of the caustic. The viscose had a viscosity approximating that of corn syrup (about 160 secs.). Contacting with the gel was effected batch-wise by stirring manually and then screening off the gel particles. Regenerated cellulose grains of composition *a* were employed, except that a somewhat larger particle size of the order of ⅛" was utilized, and the water content of the gel was determined to be 80%.

In a typical test, 520 gms. of the gel grains were added to 2100 gms. of the viscose solution and the mixture stirred thoroughly for 30 minutes, when it was found that substantial dialytic transfer equilibrium existed. The gel grains were then strained off and washed by stirring with 1000 gms. of distilled water for 30 minutes, when caustic dialytic transfer equilibrium was attained.

The composition of the treated viscose solution was determined to be 4.2% NaOH, 8.4% cellulose and 2.0% $CS_2$ with the balance water. Thus, the granular gel dialysis effected a 1.0% reduction in the caustic of the original sample. The caustic recovered from the gel was sufficiently pure for re-use and its removal from the viscose was advantageous in that less regeneration acid was required for subsequent rayon manufacture than would otherwise be the case.

*Example 5.—Recovery of sodium chloride from carboxy methyl cellulose*

In this example NaCl was separated continuously from a water solution of carboxy methyl cellulose by the use of apparatus such as that shown in Fig. 1. Carboxy methyl cellulose beads of the composition and characteristics described in *h* hereinabove were utilized as the granular gel. The carboxy methyl cellulose processed was prepared from vat-dyed wood pulp of blue color, so that it was possible to determine its presence by visual observation during all processing steps.

The feed solution, having a composition of 2.0 gms. NaCl and 0.10 gm. carboxy methyl cellulose per 100 cc. of water, was introduced to the extractor at the rate of 50 cc./min. in counter-current flow to the carboxy methyl cellulose gel beads which were supplied at the rate of 135 gms./min. The feed effluent withdrawn from the extractor at the rate of 50 cc./min. had a NaCl content of 0.788 gms. and a carboxy methyl cellulose content of 0.0815 gms. per 100 cc. of water.

The beads withdrawn from the extractor had a surface liquid carry-over of 10 cc. of feed solution per 135 gms. of beads, and no attempt was made to wash this occluding material from them prior to the counter-current stripping. Distilled water was employed as the stripping liquid and the stripper effluent, which measured 103 cc./min., analyzed 0.595 gm. NaCl and 0.012 gm. carboxy methyl cellulose, both referred to 100 cc. of effluent. The beads recycled from the stripper to the extractor were free of blue coloration and did not contain any discernible quantity of carboxy methyl cellulose solute.

Where it is not desired to recover the gel for reuse stripper 16 may be dispensed with and the gel passed on to other processing equipment for recovery of the crystalloids therein (as by drying and burning off the gel, where a carbonaceous gel is employed), or the gel with its crystalloid burden may be discarded as waste if there is no economic advantage in the recovery of the crystalloids by stripping.

From the foregoing it will be understood that the process of this invention comprises a substantial improvement in the art of dialysis, having advantages of compactness, flexibility, freedom from leakage due to perforation of the dialytic medium, and economy in first cost and maintenance. It will be apparent that my process is subject to wide modification within the skill of the art without departing from the essential spirit of the invention, wherefor it is intended to be limited only within the scope of the following claims, it being understood that my invention comprises a process for diayltic separation substantially as defined and that no claim is made herein directed to the employment of a granular gel as a dialysis medium per se.

What is claimed is:

1. A process for the separation of the dissolved components of a dialyzable solution comprising contacting said dialyzable solution with a dialytic separation medium in the form of a loose granular gel substantially inert chemically to said solution and to any substances dissolved in said solution, effecting transfer of at least part of the dialyzable components from said solution into said granular gel, and removing said granular gel from said solution.

2. A process for the separation of the dissolved components of a dialyzable solution comprising contacting said solution with a dialytic separation medium in the form of a loose granular gel substantially inert chemically to said solution and to any substances dissolved in said solution, effecting transfer of at least part of the dialyzable components from said solution into said granular gel, removing said granular gel containing transferred dialyzable components therein from said solution, contacting said granular gel containing transferred dialyzable components therein with a liquid in which said dialyzable components are soluble, and effecting transfer of at least part of said dialyzable components from within said granular gel to said liquid.

3. A process for the separation of the dissolved components of a dialyzable solution according to claim 2 wherein said granular gel from which said dialyzable components have been transferred to said liquid is removed from said liquid and is employed to contact an additional portion of said dialyzable solution to be treated.

4. A process for the continuous separation of the dissolved components of a dialyzable solution comprising contacting a flowing stream of solution to be treated with a dialytic separation medium in the form of a loose granular gel moving in counter-current relationship to said stream, said granular gel being substantially inert chemically to said solution and to any substances dissolved in said solution, effecting transfer of at least part of the dialyzable components from said solution into said granular gel, continuously removing said granular gel containing transferred dialyzable components therein from said solution, contacting a flowing stream of stripping liquid with said granular gel moving in counter-current relationship to said stream of stripping liquid, effecting transfer of at least part of said dialyzable components from within said gel to said stripping liquid, and recycling said granular gel to contact additional solution to be treated.

5. A process according to claim 4 wherein said dialyzable solution comprises a water solution of caustic as the dialyzable component in mixture with dissolved hemicellulose.

6. A process according to claim 4 wherein said dialyzable solution comprises a water suspension of a silica sol in mixture with dissolved sodium sulphate as the dialyzable component.

7. A process for the separation of caustic from a water solution of viscose contaminated with caustic and carbon bisulfide comprising sequentially contacting said solution with a loose granular gel consisting of regenerated cellulose, effecting transfer of at least part of said caustic from said solution into said granular gel, removing said granular gel from said solution, contacting said granular gel with fresh water, and stripping a substantial amount of said caustic from said granular gel.

8. A process for the molecular classification of polyglucose in water solution comprising sequentially contacting said solution with a dialytic separation medium in the form of a loose granular gel substantially inert to said solution and to polyglucose, effecting transfer of a substantial amount of the lower molecular weight fraction of said polyglucose dissolved in said solution into said granular gel, removing said granular gel from said solution, contacting said granular gel with a liquid in which said lower molecular weight fraction of said polyglucose is soluble, and effecting transfer of said lower molecular weight polyglucose from said granular gel to said liquid.

References Cited in the file of this patent

UNITED STATES PATENTS

| | | |
|---|---|---|
| 2,061,505 | Collins | Nov. 17, 1936 |
| 2,123,785 | Knox et al. | July 12, 1938 |
| 2,155,704 | Goodall et al. | Apr. 25, 1939 |
| 2,395,491 | Mavity | Feb. 26, 1946 |
| 2,449,402 | Lipkin et al. | Sept. 14, 1948 |
| 2,477,671 | Warburton | Aug. 2, 1949 |
| 2,585,492 | Olsen | Feb. 12, 1952 |
| 2,594,557 | Hirschler | Apr. 29, 1952 |
| 2,600,106 | Garrett | June 10, 1952 |
| 2,614,133 | Ockert | Oct. 14, 1952 |

OTHER REFERENCES

Colloid Chemistry, Alexander, vol. 1 (1926), pp. 767–789, pub. by Chemical Catalog Co., Inc., New York.

Biochemical Journal, vol. 45 (1949), p. 582.

Webster's New International Dictionary 2nd Edition (1940).